United States Patent [19]

Rückert et al.

[11] Patent Number: 4,682,906
[45] Date of Patent: Jul. 28, 1987

[54] DEVICE FOR THE CLAMPING CONNECTION OF STRUCTURAL PARTS WHICH ARE SPACED FROM EACH OTHER

[75] Inventors: Edward Rückert, Wuelfrath; Gerhard Gölz, Velbert, both of Fed. Rep. of Germany

[73] Assignee: Ewald Witte & Co., Velbert, Fed. Rep. of Germany

[21] Appl. No.: 783,901

[22] Filed: Oct. 3, 1985

[30] Foreign Application Priority Data

Oct. 3, 1984 [DE] Fed. Rep. of Germany ....... 3436166
May 23, 1985 [EP] European Pat. Off. ........ 85106335.4

[51] Int. Cl.⁴ ............................ B25G 3/00; F16B 2/14
[52] U.S. Cl. .................................. 403/409.1; 384/626; 411/535
[58] Field of Search ..................... 411/535, 536, 546; 403/409.1, 408.1; 384/626

[56] References Cited

U.S. PATENT DOCUMENTS 1,344,417 6/1920 Lovekin .............................. 411/535
1,362,270 12/1920 Socie .
2,248,715 7/1941 Mafera .
2,883,012 4/1959 Hoffman .......................... 403/408.1
4,433,879 2/1984 Morris ............................. 411/535 X

FOREIGN PATENT DOCUMENTS 53811 10/1890 Fed. Rep. of Germany .
237216 8/1911 Fed. Rep. of Germany .
3037606 8/1982 Fed. Rep. of Germany .
2506375 11/1982 France .

Primary Examiner—Andrew V. Kundrat
Attorney, Agent, or Firm—Martin A. Farber

[57] ABSTRACT

The invention concerns a device for the clamping connection of structural parts which are spaced apart from each other by means of a spacer disk arranged within said space and resting by its outer broad side against one structural part. For easier mounting the spacer disk, in order to obtain an axial displacement, derived from its rotation, to the free distance between the structural parts, is provided with helical pitched bearing surfaces opposite which there are form-fitting helical mating, pitched bearing surfaces which are coordinated to the other structural part.

12 Claims, 43 Drawing Figures

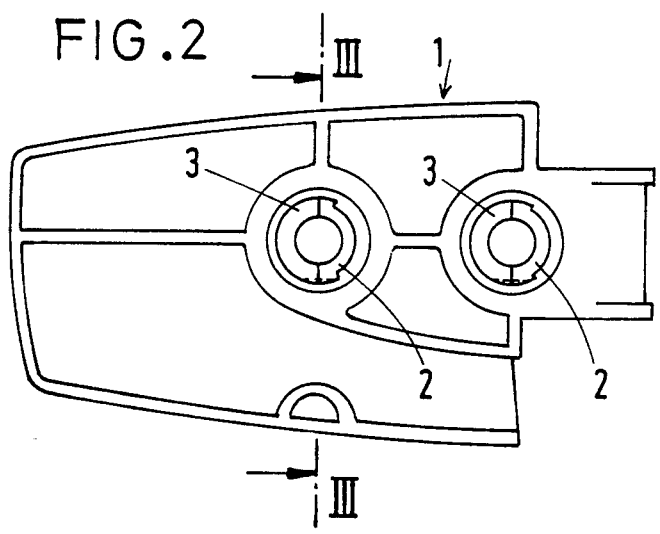
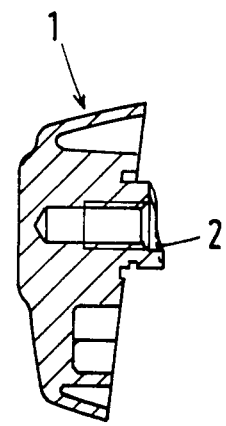
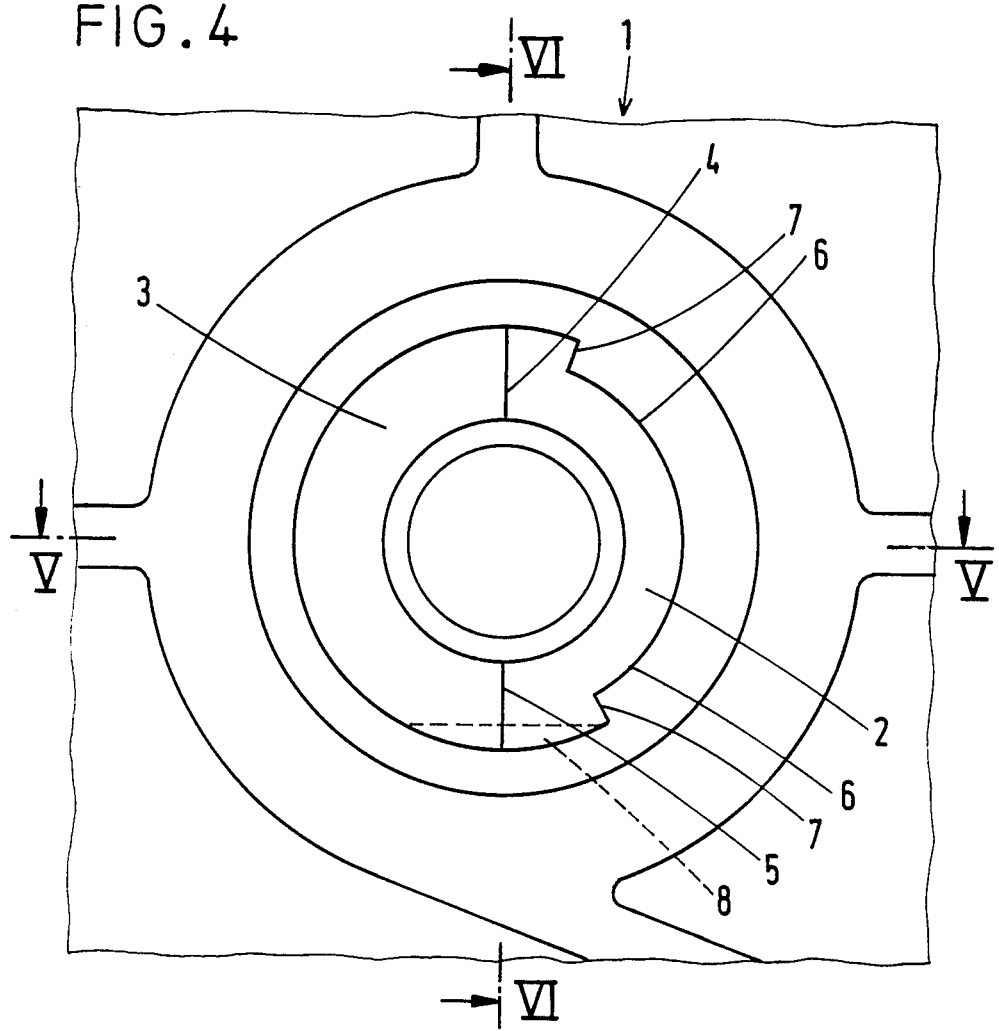

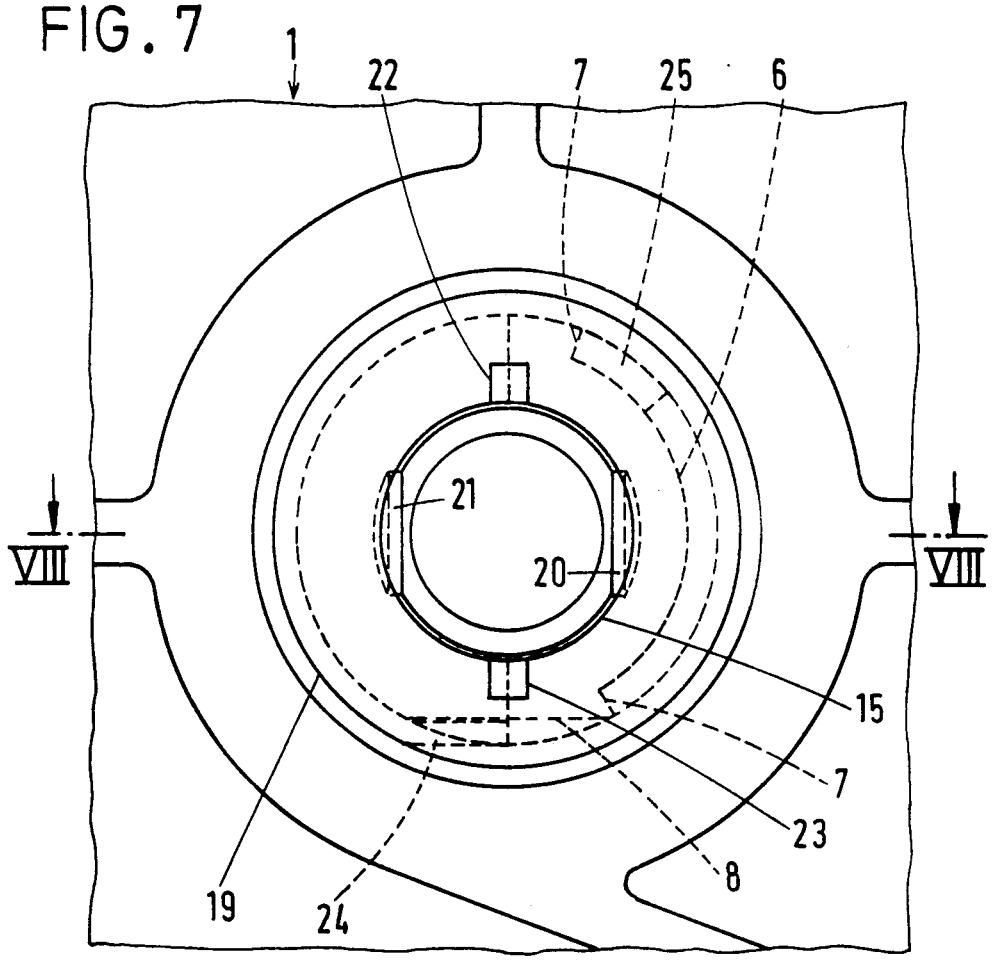
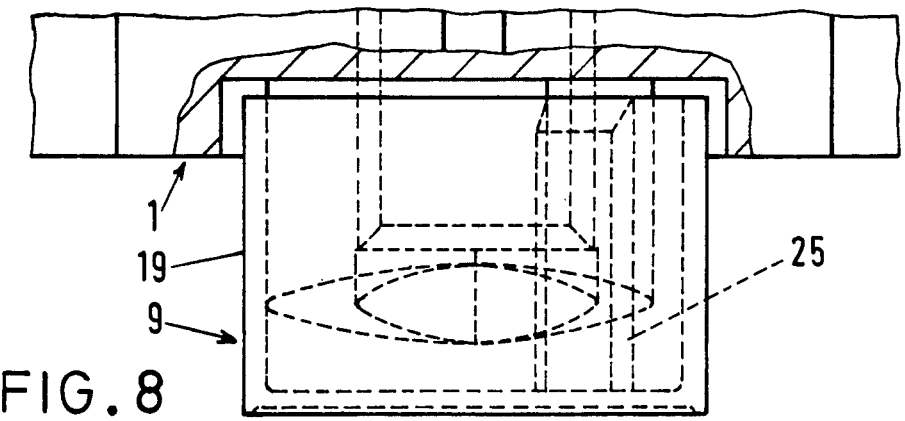

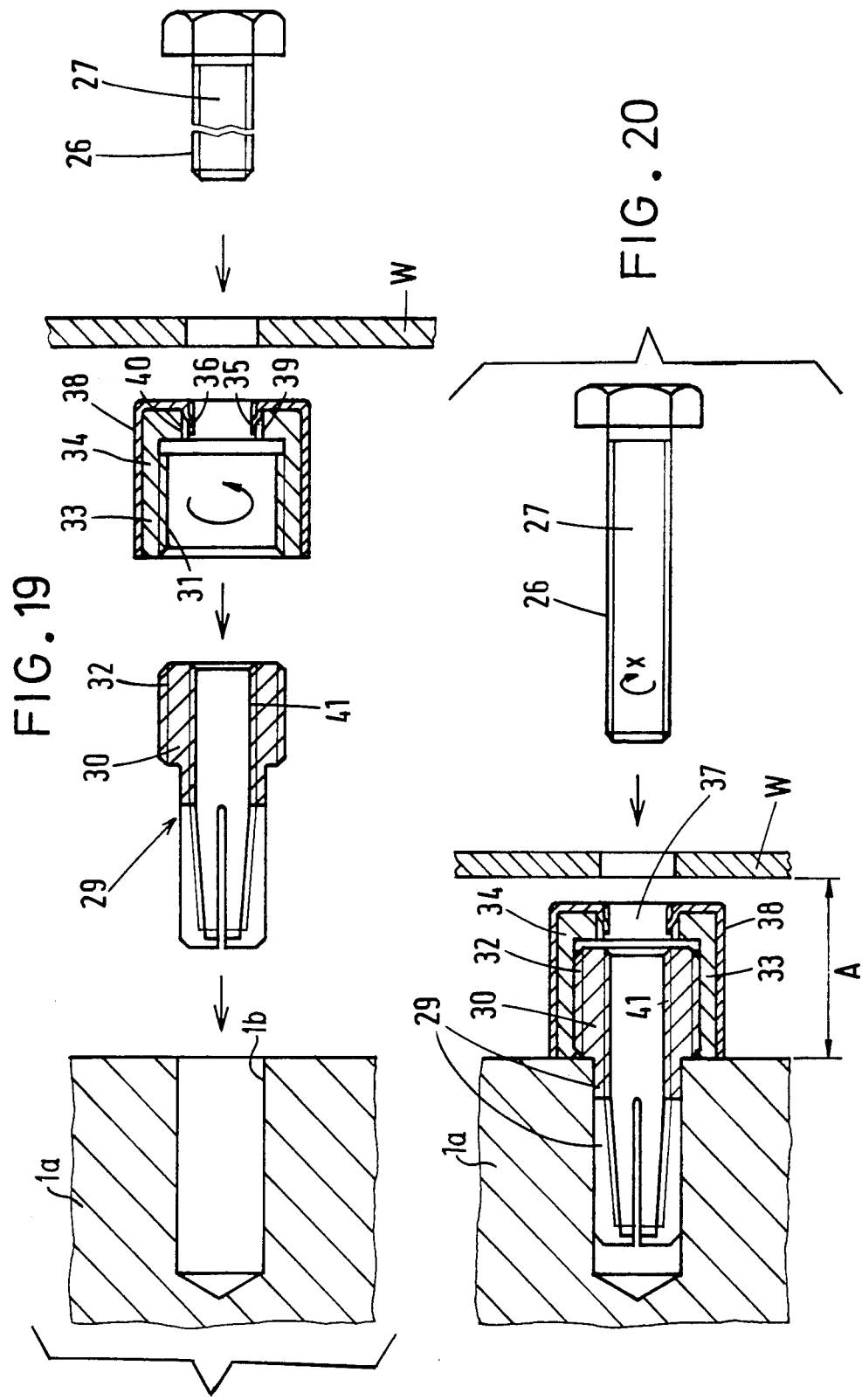

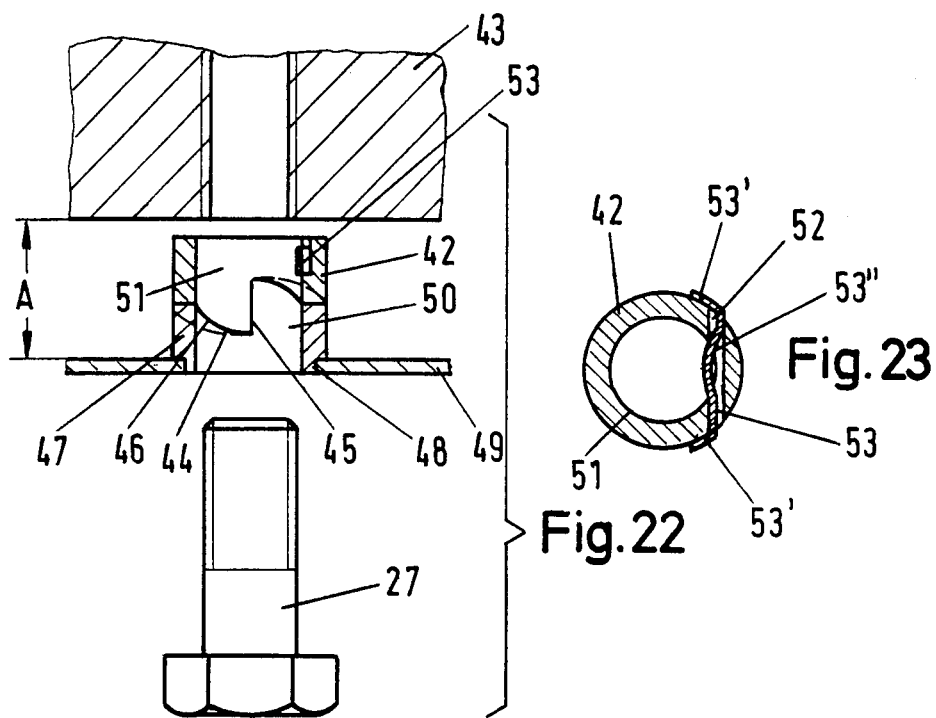
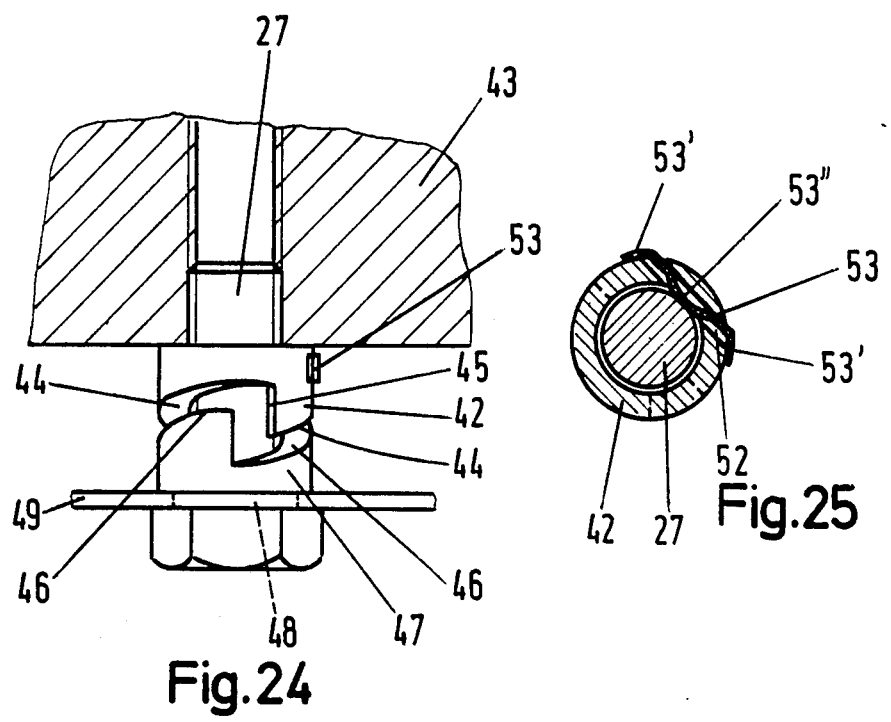

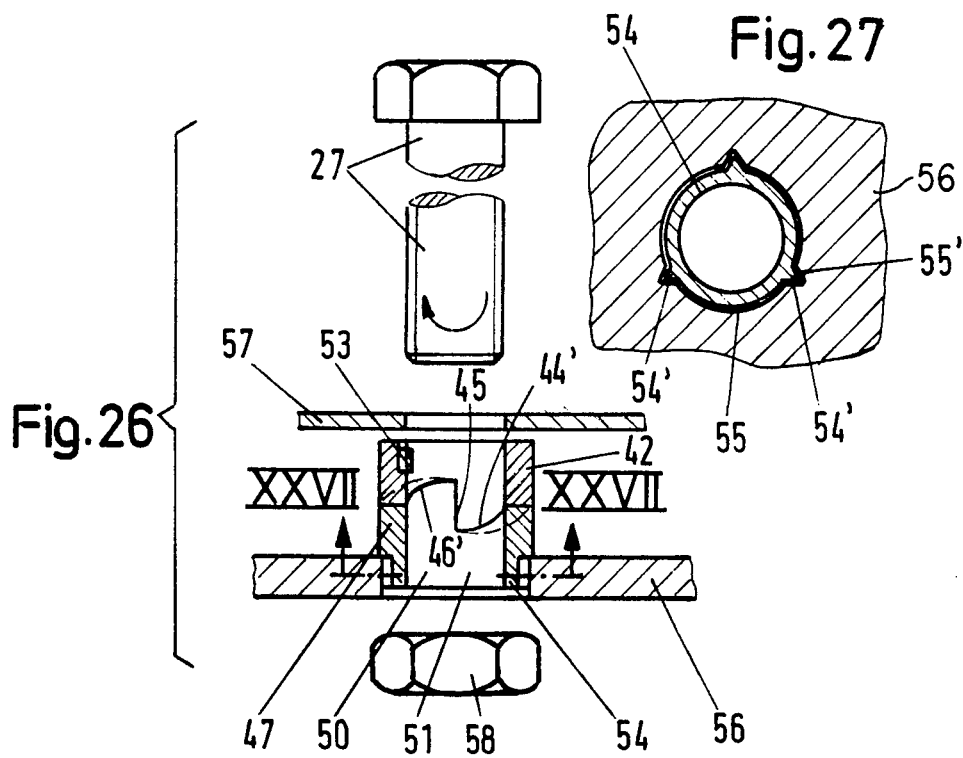
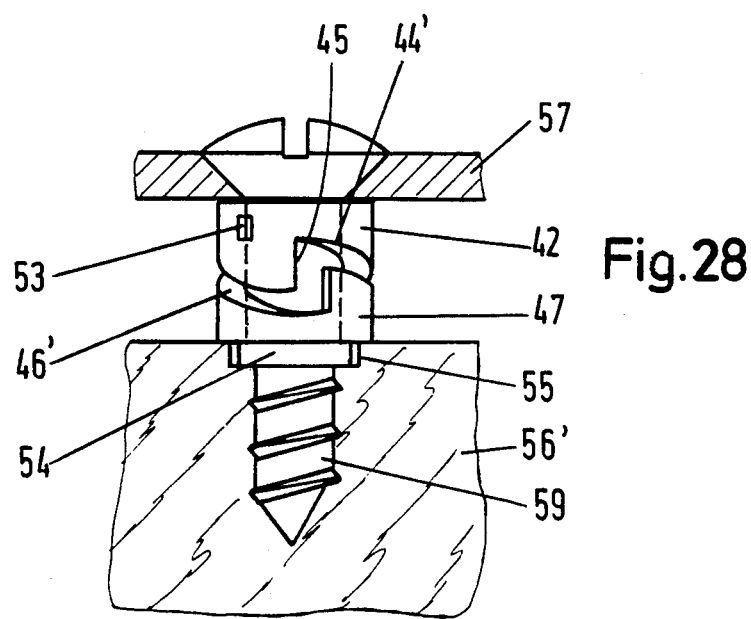

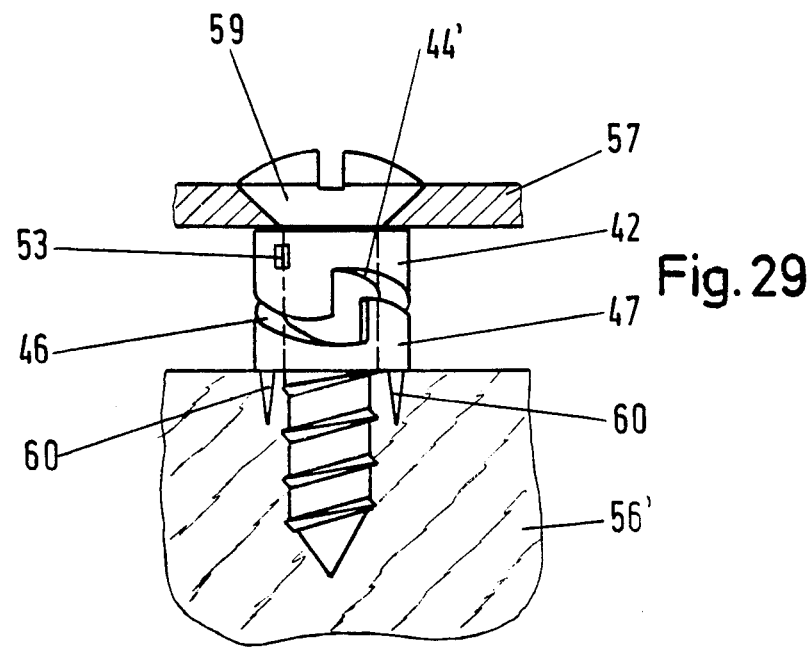
Fig. 29
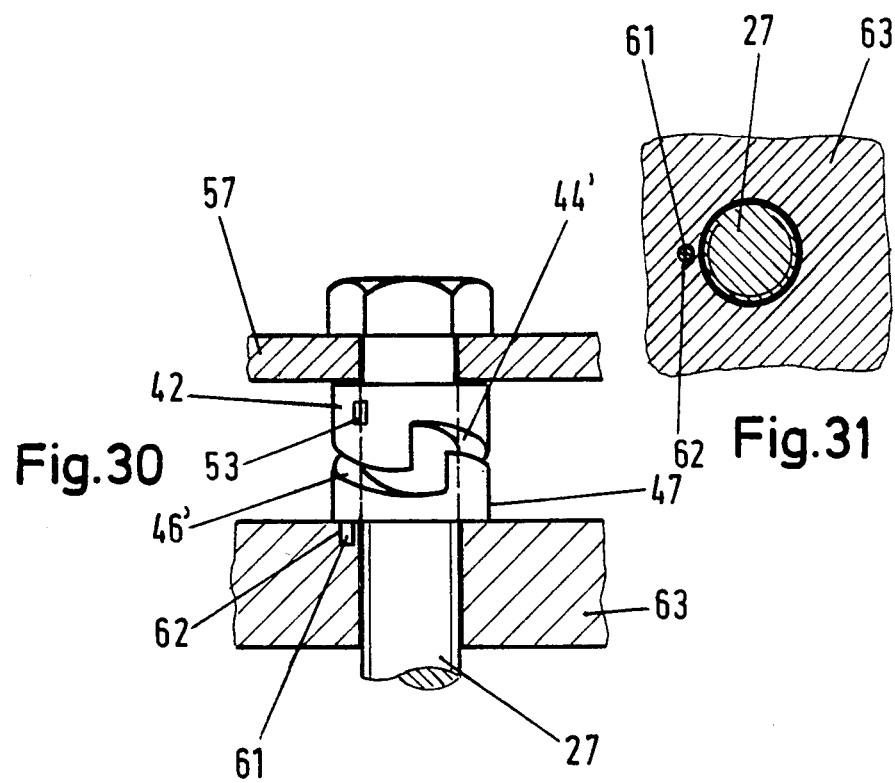
Fig. 30
Fig. 31

DEVICE FOR THE CLAMPING CONNECTION OF STRUCTURAL PARTS WHICH ARE SPACED FROM EACH OTHER

FIELD AND BACKGROUND OF THE INVENTION

The present invention relates to a device for the clamping connection of structural parts which are spaced from each other by means of a spacer disk arranged for rotation in said space and resting with its outer broad side against one structural part.

In the known devices of this type, the thickness of the spacer disk must correspond to the distance between the two structural parts. This is expensive, particularly with respect to mounting. It is attempted in practice to provisionally solve this problem by adding or removing spacer disks of different thickness.

SUMMARY OF THE INVENTION

The object of the present invention is to develop a device of the introductory-mentioned type in such a manner that the spacer disk can be brought into the bearing position merely by turning.

According to the invention the spacer disk (9, 34, 42, 82, 89, 95) includes means for axially displacing the spacer disc by rotation thereof to the open distance between the structural parts, said means comprising helical first pitched bearing surfaces (10, 11, 31, 44, 44', 83, 87), and form-fitting helical mating second pitched bearing surfaces (2, 3, 32, 46, 46', 80, 86) coordinated with the other structural part which are located cooperatively opposite said first pitched bearing surfaces.

As a result of this development, there is created a device of the introductory-mentioned type which, while being of simple structural shape, assures easy mounting regardless of the distance actually present between the two structural parts. If there is still a distance between the outer broad side of the spacer disk and the facing structural part after the insertion of the disk it is merely necessary to turn the spacer disk, which moves into such a position that the positioning resulting from the pitched bearing surfaces and mating pitched bearing surfaces results in a spacing which corresponds to the actual space between the structural parts. The structural parts can then be clamped together by means of rivets, dowels, hollow rivets or screws, the spacer disk representing the bridging of the space. It is also possible to fasten the spacer disk by spot welding, applied adhesive, etc., after it has been turned into its bearing position. However, the entrainment (carrying along) of the spacer disk by a rivet, dowel, hollow rivet or fastening screw is also permitted. These parts pass by insertion into frictional locking with the spacer disk so that the spacer disk can be turned into its bearing position. The clamping force of the fastening screw, etc, prevents the spacer disk from turning backward during subsequent use. Assurance with respect to this is favored by tooth steps on the pitched bearing surfaces and/or mating pitched bearing surfaces. The pitched bearing surfaces can be provided on the wide side of the spacer disk, on its outer wall surface or on the wall of its inner cavity. The direction of tightening of the fastening screw can be opposite to or in the same direction as the pitched bearing surfaces of the spacer disk, depending on the arrangement of the screw with respect to the spacer disk and the structural part. The corresponding frictional locking between the outer wall surface and the fastening screw makes any use of an additional special tool for the turning of the spacer disk superfluous. Obtaining the frictional locking with a corresponding plastic mount is of considerable advantage for dependable entrainment and also makes it possible to develop the spacer disk of hard material which withstands the clamping forces. It is furthermore possible to develop the spacer disk of a single material having the corresponding properties. For precise turning movements of adjustment it is also possible to develop the mating pitched bearing surfaces in the manner of an outer-wall thread of the structural part. The arrangement of a corresponding resilient tongue on a plastic covering which forms the frictional locking provides, in combination with a shoulder provided on the other structural part, the possibility of fastening the spacer disk initially as sort of a pre-mounting on the structural part. It can then not be lost and the structural part can be easily applied, even at places which are of difficult access. The frictional locking is then obtained upon the insertion of the fastening screw. Since the latter must be screwed into its mating thread by at least a few turns, the frictional-locking entrainment leads to a reliable carrying along of the spacer disk up into the turned position which bridges over the open space. A stop for limiting the turning movement of the spacer disk can, if needed be provided to advantage, limiting the maximum rotation to the peripheral length of one inclined surface.

Another embodiment is characterized by forming the mating pitched bearing surfaces on the front end of a collar pressed out of the structural part. It is also possible to provide the mating pitched bearing surfaces on a bushing which is non-rotatably secured by means of a pin protruding from the annular surface which faces the structural part and extends into a hole in the structural part. The connection can also be accomplished by screwing. Furthermore, the pin can be clipped in place. A form locking between pin and hole is also possible, in the manner that the pin is provided as a collar with protruding ribs which enter into corresponding noches in the hole. It is then possible to arrange the mating pitched bearing surfaces which are on the structural-part side on a bushing provided with a flange, the flange being fastened to the structural part by spot welding or by cementing (adhering in general). Another possible manner of obtaining the frictional locking is to coordinate a suitably aligned leaf spring with the spacer disk, which spring then frictional lockingly engages the clamping element upon the insertion of the latter. A particularly easy mounting is obtained in this case by inserting the leaf spring from the wide side into a secant-shaped channel. The entraining of the spacer disk can also be obtained by a form lock between the fastening screw and spacer disk. When the spacer disk has entered into its bearing position, the form lock is destroyed by turning the fastening screw further with respect to the stationary spacer disk.

BRIEF DESCRIPTION OF THE DRAWINGS

Various embodiments of the object of the invention are shown in the accompanying drawings, in which FIG. 2 is a view as seen in the direction of the arrow II in FIG. 1, FIG. 3 is a section along the line III—III in FIG. 2, FIG. 4 is a view, on a larger scale, of the mating pitched bearing surfaces of the bearing block, FIG. 7 is a view corresponding to FIG. 4 but with plastic mount placed on, FIG. 8 is a section along the line VIII—VIII of FIG. 7, FIG. 19 shows the second embodiment of the device, in an enlarged sectional view, before mounting, FIG. 20 is a sectional view similar to FIG. 19 but with the spacer disk already applied, FIG. 22 is a longitudinal section through the third embodiment before the screwing-in of the fastening screw, FIG. 23 is a cross section through the spacer disk in the region of the leaf spring which produces the frictional lock, FIG. 24 shows the device in clamping position, partially in section and partially in elevation, FIG. 25 is a corresponding cross section through the device in the region of the leaf spring, FIG. 26 is a longitudinal section through the device according to the fourth embodiment, before the insertion of the fastening screw, FIG. 27 is a cross section along the line XXVII—XXVII of FIG. 26, FIG. 28 shows the device according to the fifth embodiment in its clamping position, FIG. 29 shows the device according to the sixth embodiment in its clamping position, the bushing which has the mating pitched bearing surfaces being secured against turning on the structural part by means of prongs, FIG. 30 shows the seventh embodiment of the device, in which the securing of the bushing against turning is effected by means of a pin which protrudes from the annular-surface side, FIG. 31 is a cross section through the device at the height of the pin.

DETAILED DESCRIPTION OF THE PREFERRED EMBODIMENTS

Figure 1:
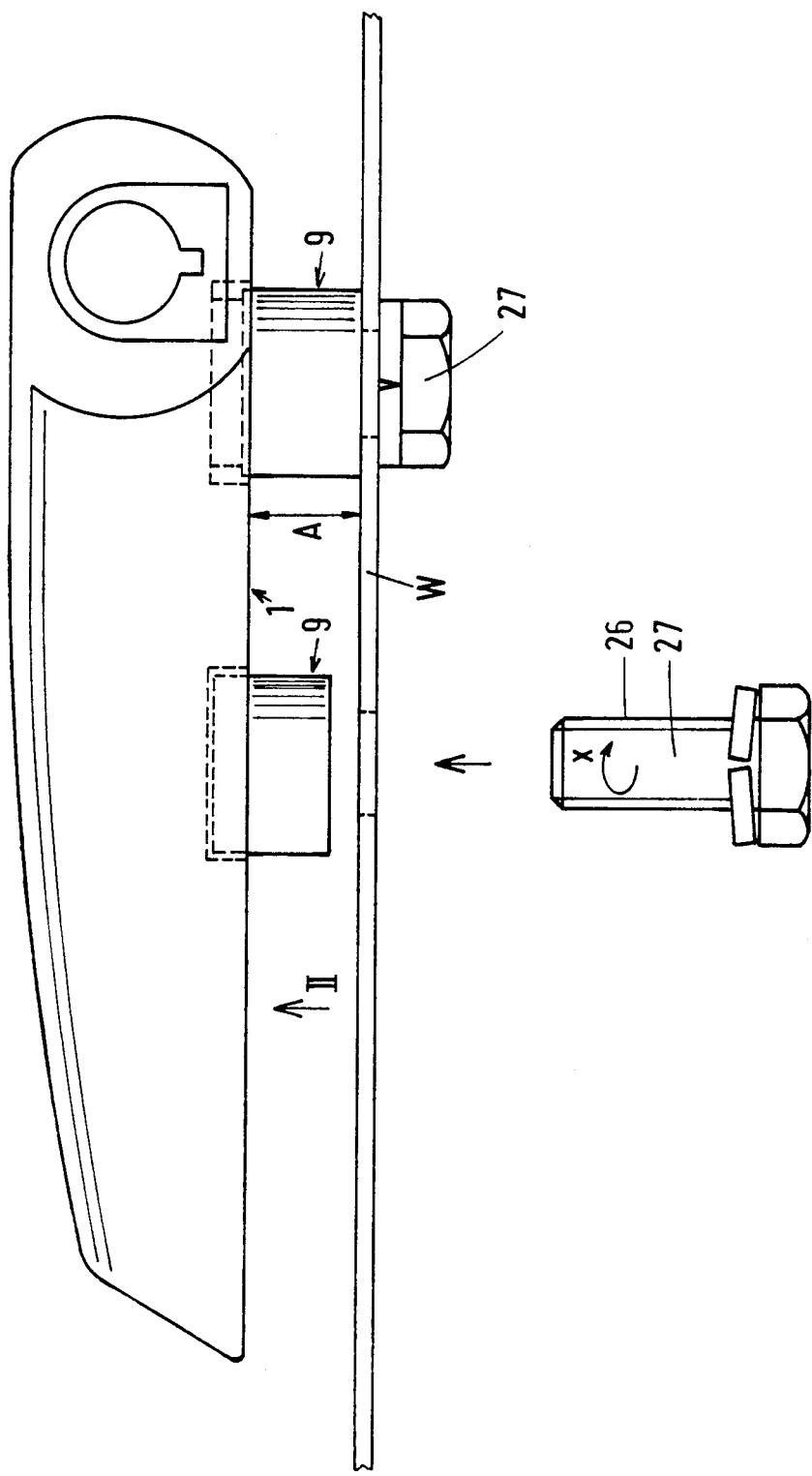
FIG. 1 shows, on an enlarged scale, a bearing block as a structural part of a hinge, with spacer disks arranged in the space from the wall of attachment, one of said disks having already been brought into its bearing position, relating to the first embodiment.
Figure 5:
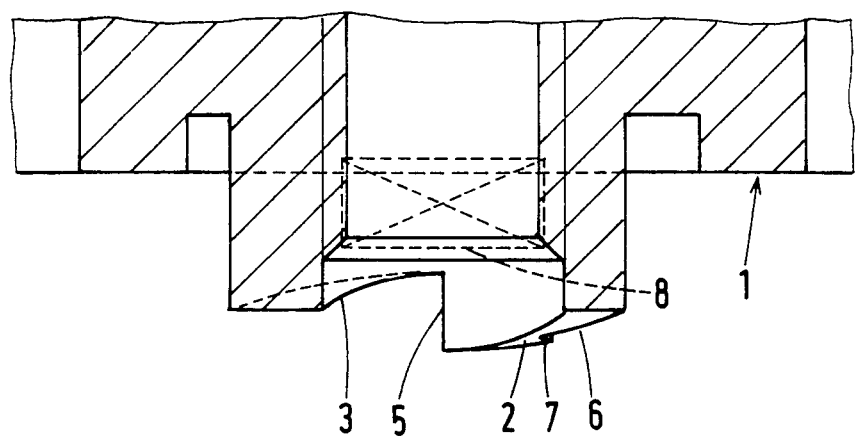
FIG. 5 is a section along the line V—V of FIG. 4.
Figure 6:
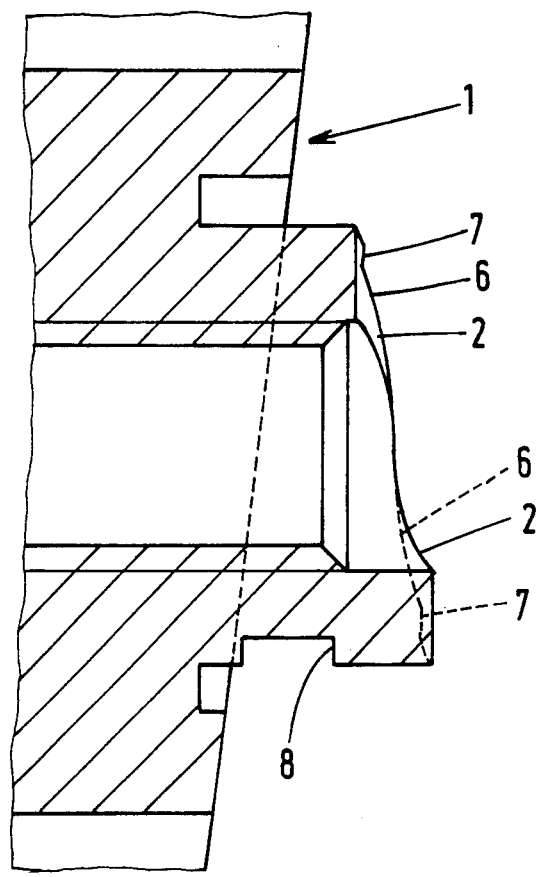
FIG. 6 is a section along the line VI—VI of FIG. 4.
Figure 9:
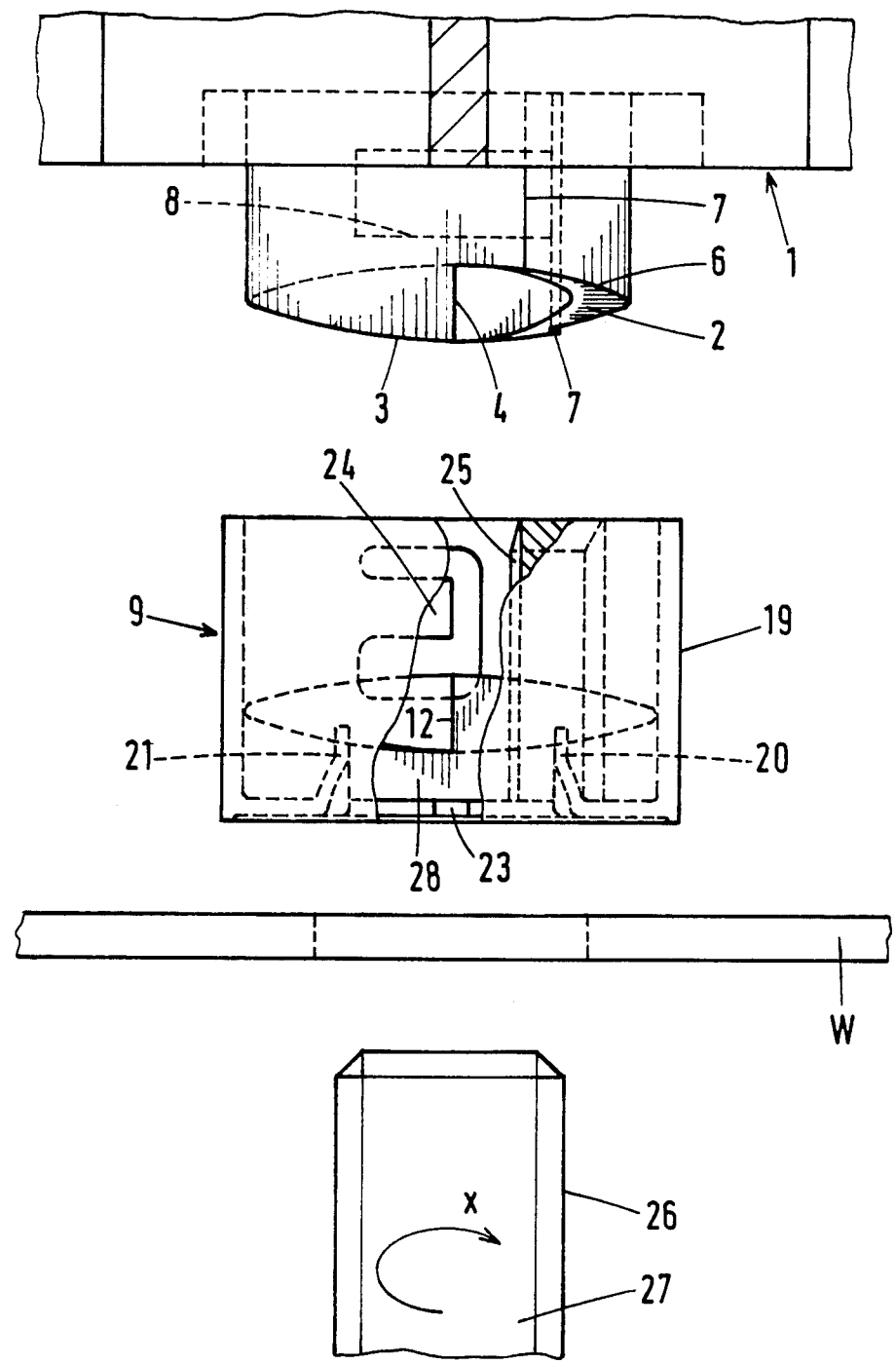
FIG. 9 shows the parts to be connected, in considerably enlarged size, prior to the mounting.
Figure 10:
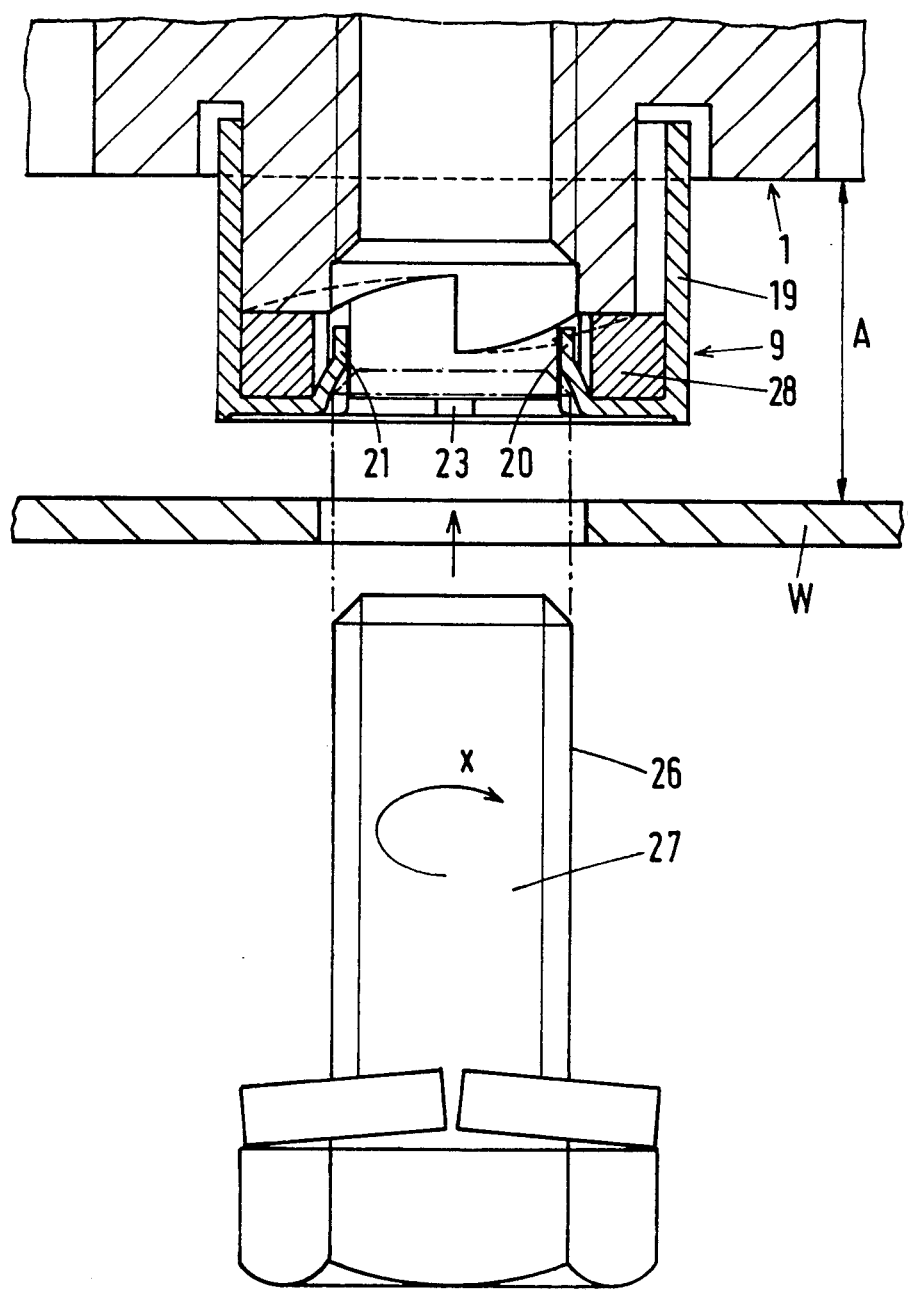
FIG. 10 is a view similar to FIG. 9 but with the plastic mount placed on, shown in cross section.
Figure 11:
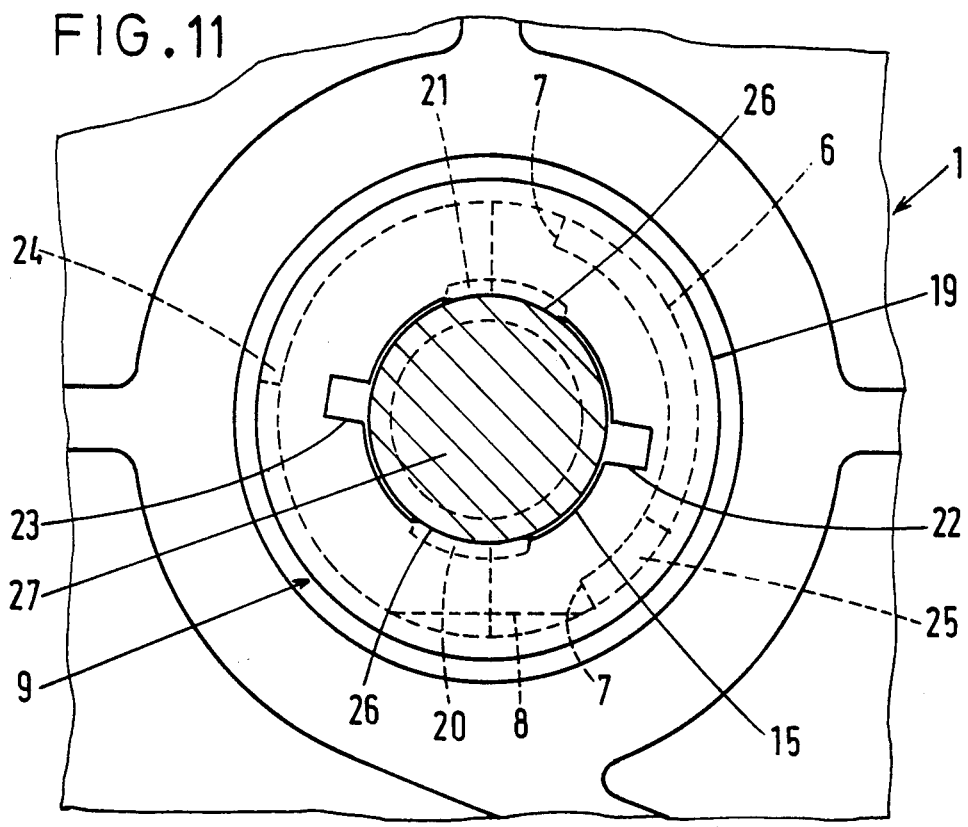
FIG. 11 is a view corresponding to FIG. 7, but after the mounting.
Figure 12:
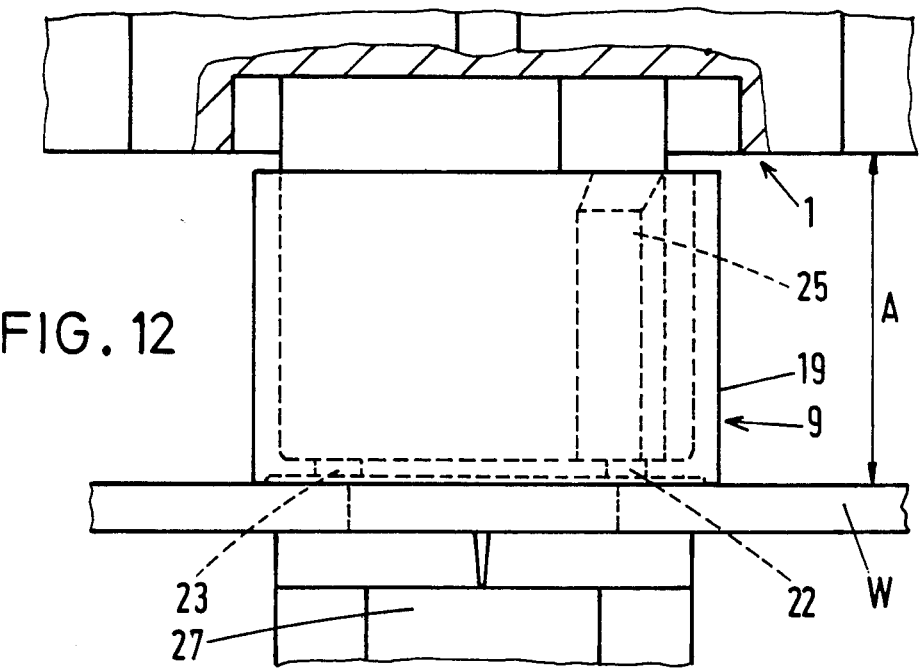
FIG. 12 is a top view of FIG. 11.
Figure 14:
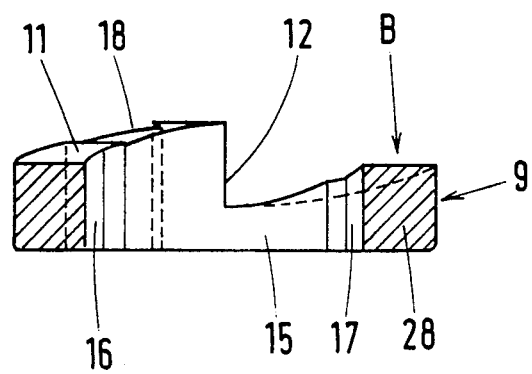
FIG. 14 is a section along the line XIV—XIV of FIG. 13.
Figure 13:
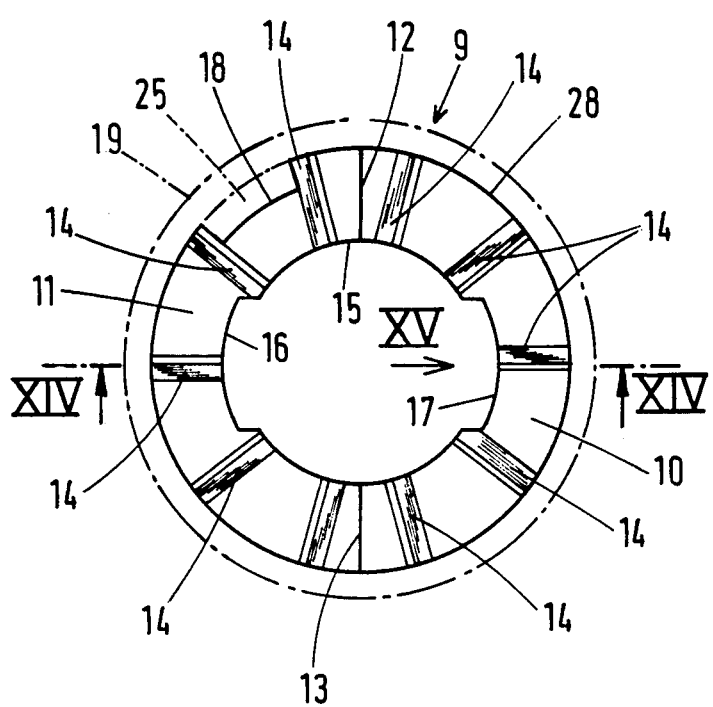
FIG. 13 is a top view of the spacer disk shown on a greatly enlarged scale.
Figure 15:
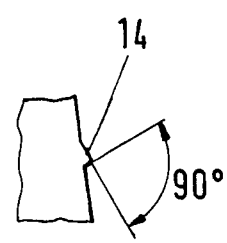
FIG. 15 is a broken-away view in the direction of the arrow XV of FIG. 13, showing a tooth step.
Figure 17:
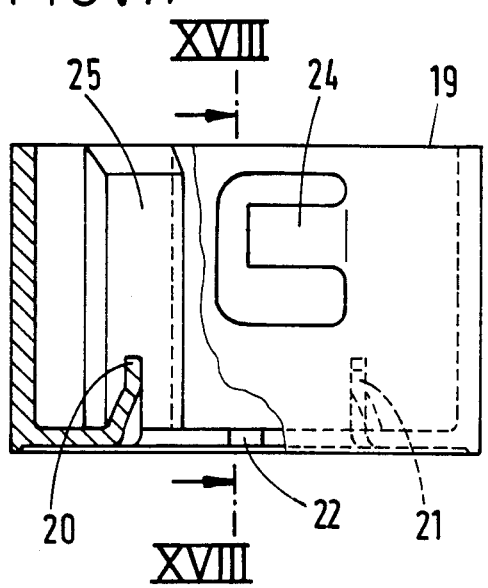
FIG. 17 is a side view of the plastic mount, partially broken away.
Figure 18:
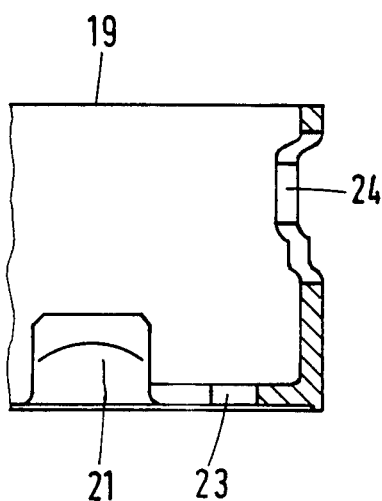
FIG. 18 is a section along the line XVIII—XVIII of FIG. 17.
Figure 16:
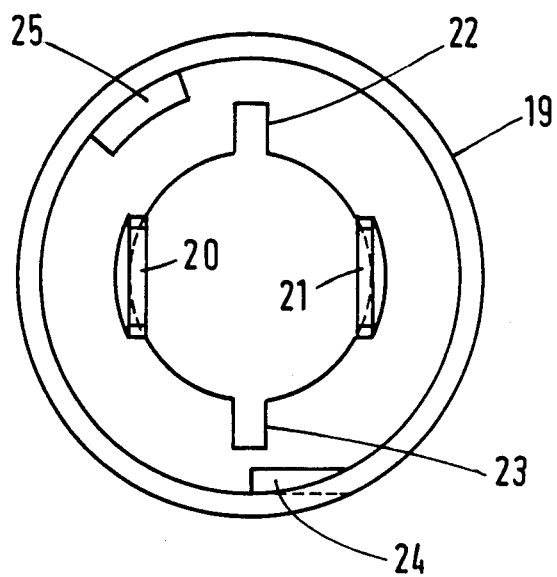
FIG. 16 is a top view of the plastic mount on a greatly enlarged scale.

In accordance with the first embodiment, shown in FIGS. 1 to 18, two integrally developed collars extend from the rear of a hinge-like structural part 1, each of the collars forming at its end in each case two helical left-hand mating pitched bearing surfaces 2, 3. The collars surround an internal thread of the structural part 1. The two mating pitched bearing surfaces 2 and 3 are limited by diametrically located steps 4 and 5. The mating pitched bearing surface 2 forms, by means of a semicircular recess, radial steps 6, 7 for limiting the turning of a spacer disk 9. Furthermore, a shoulder 8 is provided on it for engaging behind a spring tongue 24 of the spacer disk 9.

The spacer disk 9 also has two helical pitched bearing surfaces 10 and 11 which are limited by diametrically located steps 12 and 13. The pitched bearing surfaces 10 and 11 are located on the wide side B of the spacer disk 9 and are provided with radially protruding tooth steps 14. The flanks of different length of each tooth step 14 form an angle of about 90°. The spacer disk 9 furthermore has an inner opening 15 with two opposite bays 16 and 17 to receive the collar sections 20 and 21 of a plastic mount 19. On the outer periphery of the spacer disk 9 there is provided, between two tooth steps 14, a radial cutout 18 to receive a rotation stop 25 of the plastic mount 19. The latter is of cup shape and forms on its bottom the two inwardly directed collar sections 20 and 21. These collar sections 20 and 21 produce the frictional locking with the outer wall surface 26 of the fastening screw 27 which is introduced in the screwing-in direction x.

The plastic mount 19 surrounds a metal disk 28 of the spacer disk a and is secured against dropping out, after its insertion, on the mating pitched bearing surfaces 2, 3, by the tongue 24 which engages behind the shoulder 8. In addition, the plastic mount 19 has the rotation stop 25 which extends over the entire height of the cup. This rotation stop 25 enters into the radial cutout 18 of the metal disk 28 of the spacer disk 9 and connects these two parts in non-turnable manner to each other. The spacer disk 9 (or the plastic mount 19) is formed laterally of its inner opening 15 with inner diametric insertion slots 22, 23 for a tool for turning the spacer disk. The mounting is effected as follows: After the placing of the spacer disks 9 on the collars which form the mating pitched bearing surfaces 2, 3, the spacer disks 9 are in a position in which the radial steps 4, 5 of the mating pitched bearing surface 3, 2 and the radial steps 12, 13 of the spacer disk 9 come against each other. The mating pitched bearing surfaces 2, 3 and bearing surfaces 10, 11 then lie with their surfaces on each other over their entire length so that there is then still a space between the bottom wall of the plastic mount 19 and the fastening wall W for the structural part 1. This means that the spacer disk 9 lies in the space A between structural part 1 and fastening wall W.

The fastening screw 27 which has a right-hand thread, is now screwed in. As a result of frictional lock between its outer wall surface 26 and the collar sections 20, 21, it carries the spacer disk 9 along with it in the screwing-in direction x and, as a result of the oppositely directed pitched bearing surfaces 10, 11 of the spacer disk 9, the spacer disk 9 is pressed away from the collar until the bottom of the cup comes against the fastening wall W. The clamping can then be effected, the spacer disk taking up the clamping force of the screw.

Figure 21:
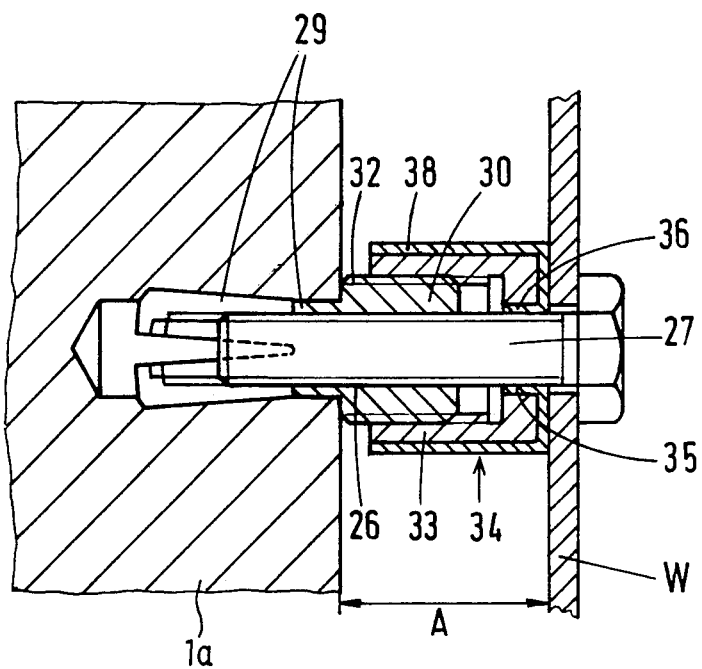
FIG. 21 shows the parts to the be connected in accordance with FIG. 19, but after mounting.

In accordance with the second embodiment, shown in FIGS. 19 to 21, the mating pitched bearing surfaces are located on the head 30 of a dowel pin 29. Said surfaces are formed by a thread 32 (left-hand thread) on the wall side.

The spacer disk 34 has a metal disk 33. The latter has an inner opening 37 with two bays 39 and 40 opposite each other to receive the collar sections 35 and 36 of a plastic mount 38 which grips around the metal disk 33.

The metal disk 33 has the pitched bearing surfaces on the inner cavity in the form of an internal thread 31 (left-hand thread).

The plastic mount 38 is of cup shape and forms on its bottom two inward-directed collar sections 35 and 36. These collar sections 35 and 36 produce the frictional locking with the outer wall surface 26 of the fastening screw 27 introduced in the screwing-in direction x. The fastening screw 27 has a right-hand thread. It is screwed into the internal thread 41 of the dowel pin 29.

This screw connection is produced as follows: First of all, the dowel pin 29 is inserted into a corresponding hole 1b in a structural part 1a. The head 30 of the dowel pin 29 forms, with its wall side thread 32, the mating pitched bearing surfaces for the pitched bearing surfaces of the thread 31 of the spacer disk 34. The spacer disk 34 is screwed on up to the position shown in FIG. 20 so that a space remains between the cup bottom of the plastic mount 34 and the fastening wall W.

The fastening screw 27 is now passed through a hole in the fastening wall and screwed into the internal thread 41 of the dowel pin 29.

As a result of frictional locking between the wall surface 26 and collar sections 35, 36, the spacer disk 34 is carried along in the screwing-in direction x. The oppositely directed thread between the spacer disk 34 and the dowel head 30 causes the spacer disk 34 to be shifted in the direction towards the fastening wall W and to abut against same (FIG. 21).

The spacer disk thus represents the abutment which bridges over the space A, for the fastening wall W.

In accordance with the third embodiment, shown in FIGS. 22 to 25, the spacer disk 42 is provided on its broad side facing away from the structural part 43 with right-hand pitched bearing surfaces 44. The latter are limited by two diametrically opposite steps 45. Helical mating pitched bearing surfaces 46 lie in form-fitting manner opposite the pitched bearing surfaces 44. Said helical mating pitched bearing surfaces 46 are located on the facing wide side of a bushing 47. A concentric collar 48 on the opposite annular surface is connected, fixed against rotation, with the other structural part 49. The passage hole 50 of the bushing 47 is aligned with the inner opening 51 of the spacer disk 42.

In front of the broad side of the spacer disk 42 which faces the structural part 43 there extends a secant-shaped channel 52. A leaf spring 53 is inserted in it. The ends 53' of said spring are bent at an angle and rest against the outer wall surface of the spacer disk 42. The central section 53" of the leaf spring 53, on the other hand, extends arched in inward direction and is tangent to the inner opening 51 of the spacer disk 42. It thus lies in the region of passage of the fastening screw 27. Before the screwing-in of the latter, the parts of the device assume the position shown in FIG. 22. If the fastening screw 27 is now inserted, its wall surface comes into frictional locking with the leaf spring 53. Upon the screwing-in of the fastening screw, which has a right-hand thread, the spacer disk 42 is carried along positively in the same direction of rotation. As a result of the right-hand pitch of the pitched bearing surfaces 44 and mating pitched bearing surfaces 46 axial displacement of the spacer disk 42 is obtained from the rotation, the wide side of said spacer disk which faces the structural part 43 coming against the structural part 43; see FIG. 24. No further carrying along of the spacer disk 42 then takes place any longer and the fastening screw 27 can be screwed in fully, thus obtaining the clamping. In this embodiment also the corresponding pitch surfaces 44, 46 can be provided with a toothing.

In accordance with the fourth embodiment, shown in FIGS. 26 and 27, the mating pitched bearing surfaces 46' have a left-hand pitch. The pitched bearing surfaces 44' which come into engagement with them accordingly have the same pitch. In this case also the spacer disk 47 is provided with a leaf spring 53 which produces a friction locking. A pin 54 extends from the bushing 47. The pin is developed as a collar which extends concentrically to the longitudinal axis of the bushing. On its outer circumference the pin 54 has three protruding ribs 54' arranged at equal angle apart which engage in corresponding grooves 55' of the hole 55 in the structural part 56. In this way, a locking of the bushing 47 against rotation is obtained. If the fastening screw 27 is now inserted by passing it through a hole in the structural part 57 and turned in the direction indicated by the arrow, in view of its right-hand thread, the spacer disk 42 will be carried along thereby, and as a result of the left-hand pitch surfaces 44', 46' the spacer disk 42 will be displaced axially until it comes into position against the structural part part 57. A nut 58 can now be screwed onto the end of the fastening screw 27 which extends beyond the structural part 56 so as to clamp the structural parts 56, 57 together with the interposition of the spacer disk 42.

The fifth embodiment, shown in FIG. 28, is of a construction similar to the preceding one. The same structural parts therefore are provided with the same reference numbers. The fastening screw is a wood screw 59 with right-hand thread. Upon the screwing-in thereof the spacer disk 42 is displaced into the bearing position while the threaded shank engages into the structural part 56' which is of wood. The frictional lock is also produced by a leaf spring 53 which presses against the outer wall surface of the fastening screw 59.

The sixth embodiment, shown in FIG. 29, corresponds substantially to the embodiment shown in FIG. 28. The securing of the bushing 47 against turning is now effected via pins developed as prongs 60 which protrude from the annular surface of the brushing 47, are arranged at equal distances apart and engage into the structural part 56' of wood in order to effect the securing against rotation.

In the seventh embodiment, shown in FIGS. 30 and 31, a pin 61 extends from the annular surface of the bushing 47 and engages in form-fitting manner into a hole 62 in the structural part 63. If the fastening screw 27 is inserted from the side of the structural part 57 and turned, the spacer disk 42 is positively carried along in the corresponding direction, coming into its position of bearing. A nut (not shown) can then be screwed onto the end of the fastening screw 27 which protrudes beyond the structural part 63, clamping the two structural parts 57, 63 together.

Figure 32:
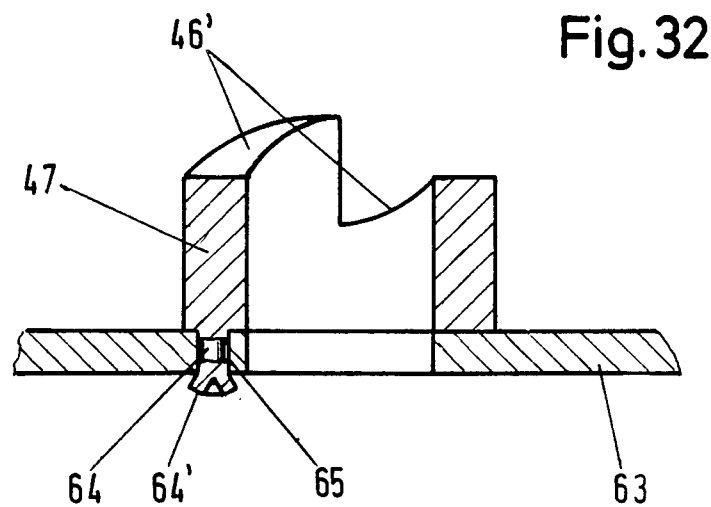
FIG. 32 shows the eighth embodiment of the device seen in cross section, the anti-rotation lock between bushing and structural part being produced by a pin which protrudes from the annular surface and, in its turn, is clipped to the hole of the structural part.

In accordance with the eighth embodiment, shown in FIG. 32, a pin 64 extends from the annular surface of the busing 47 facing the structural part 63. The pin engages into a hole 65 in the structural part 63. In this case there is a clip connection between pin 64 and hole 65, for which purpose the detent pin 64 has insert-side run-on bevels 64'.

Figure 33:
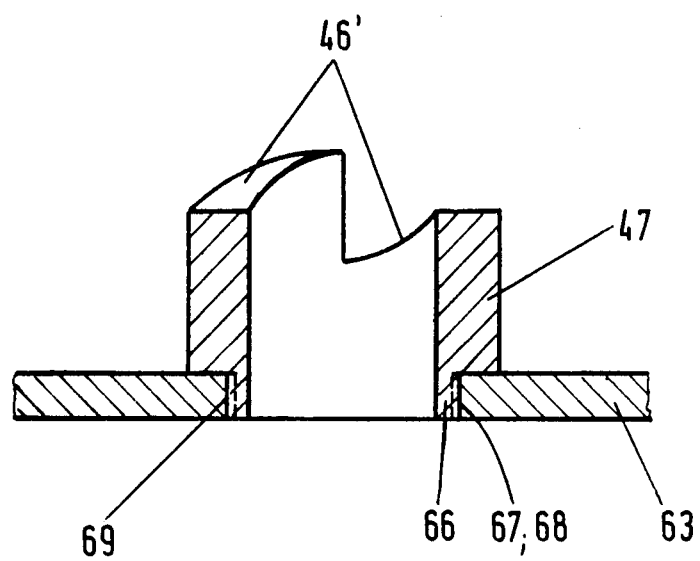
FIG. 33 shows the ninth embodiment of the device in cross section, in which a collar provided with external thread extends from the annular surface of the bushing and is screwed into an internal thread in the structural part.

In accordance with FIG. 33, which shows the ninth embodiment, a concentric pin 66 developed as a collar extends from the bushing 47 on the annular surface facing the structural part 63. The outer thread 67 of said pin comes into engagement with the inner thread 68 of the hole 69 of the structural part 63.

Figure 34:
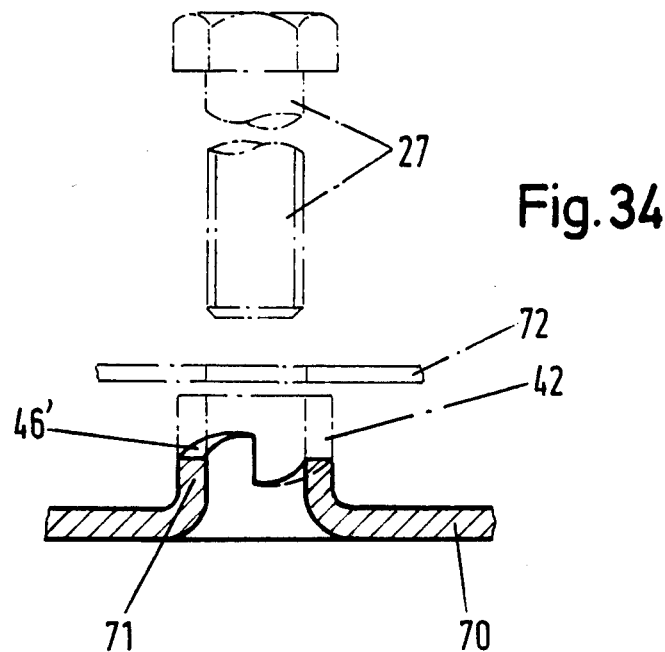
FIG. 34 shows the tenth embodiment of the device, the mating pitched bearing surfaces being provided on the front end of a collar pressed out of the structural part.

In the tenth embodiment, shown in FIG. 34, the mating pitched bearing surfaces 46' are formed on the end of a collar 71 pressed out of the structural part 70. The collar cooperates with the spacer disk 42, shown in dot-dash line, which, in its turn, is carried along into its bearing position by a fastening screw 27. A nut (not shown) can then be screwed onto the end of the fastening screw which protrudes beyond the structural part 70 in order to effect the clamping to the other structural part 72.

Figure 35:
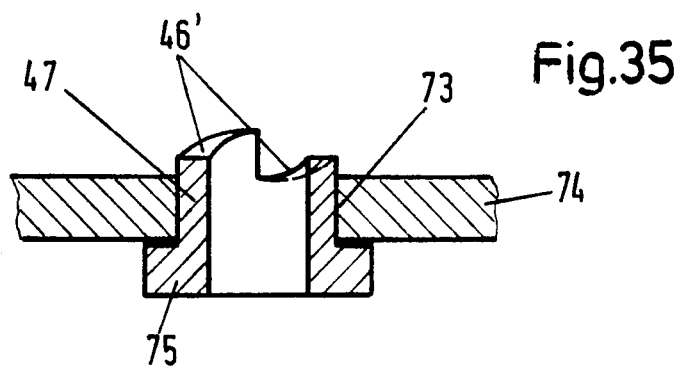
FIG. 35 is a longitudinal section through the eleventh embodiment of the device in which the mating pitched bearing surfaces are seated on a bushing which is inserted into the structural part and the flange of which is fixed on the structural part.

In FIG. 35, which shows the eleventh embodiment, a bushing 47 which forms the mating pitched bearing surfaces 46' passes through a hole 73 in the structural part 74. On the side opposite the mating pitched end surfaces the bushing 47 forms a flange 75 which comes against the bottom of the structural part 74 and is held fast there, for instance by spot welding, cementing (adhering in general), etc.

Figure 36:
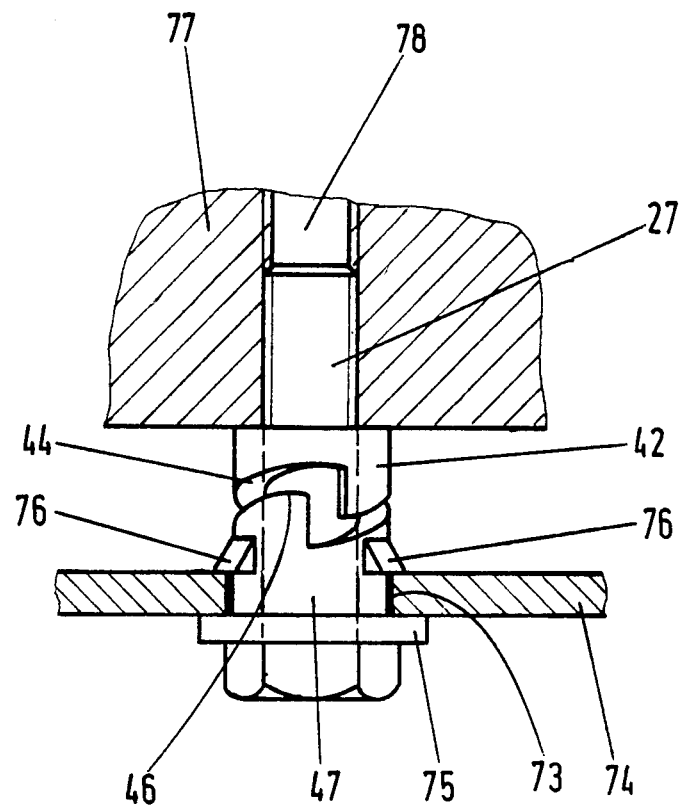
FIG. 36 shows the twelfth embodiment of the device in which the bushing is clipped to the structural part.

The twelfth embodiment, shown in FIG. 36, has a bushing 47 which is clipped to the hole 73 of the structural part 74. For this purpose, clip projections 76 extend facing the flange 75 and, after the insertion of the bushing 47, come against the top of the structural part 74 and, together with the flange 75, produce the axial non-displaceability of the bushing 47. The mating pitched bearing surfaces 46 of the bushing 47 extend with right-hand pitch. They cooperate with the correspondingly extending pitched bearing surfaces 44 of the spacer disk 42. Since the fastening screw 27 has a right-hand thread, the spacer disk 42 is also turned when the screw is screwed in, hand in hand with an axial displacement of the spacer disk 42 in the manner that it comes into the space-bearing position with respect to the opposite structural part 77, which has a correspondingly shaped inner thread 78 to receive the fastening screw 27.

Figure 37:
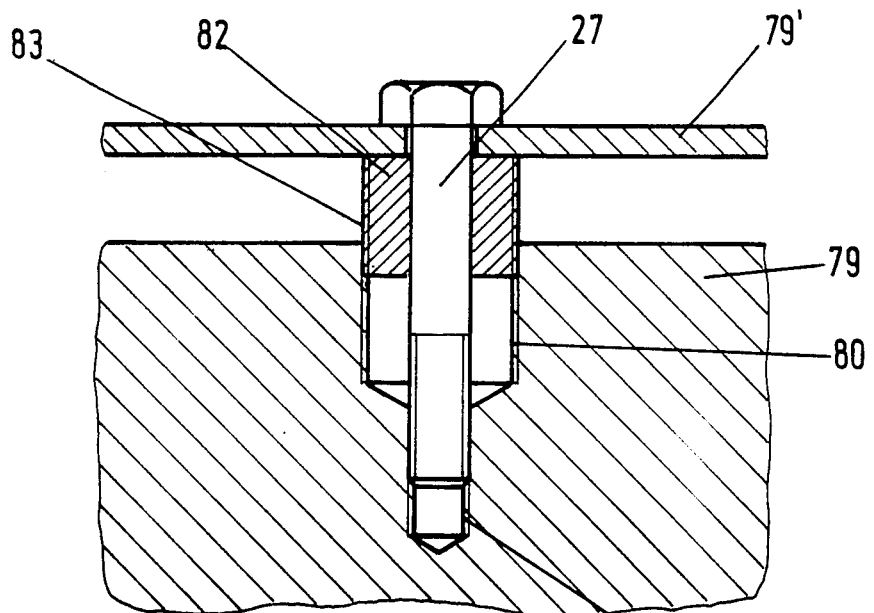
FIG. 37 shows the thirteenth embodiment of the device in longitudinal section, in clamping position.

In the thirteenth embodiment, shown in FIG. 37, two structural parts 79 and 79' are to be clamped together at a distance from each other. The structural part 79 has a threaded borehole 80 with left-hand mating pitched bearing surfaces. A threaded borehole 81 of smaller thread diameter extends axially to said threaded borehole 80. The threaded borehole 81 is provided with a right-hand thread corresponding to the external thread of the fastening screw 27. The latter passes with friction locking through a spacer disk 82 which is provided on its outer wall with a left-hand external thread 83 which forms the pitched bearing surfaces. The length of the spacer disk 82 is greater than the inside spacing between the structural parts 79 and 79' so that a part of the length of the spacer disk 82 enters into the threaded borehole 80. If the fastening screw 27 is screwed in corresponding to the pitch of its thread, this results in the carrying along of the spacer disk 82. As a result of the left-hand thread, the spacer disk 82 is displaced until it abuts against the structural part 79'. The spacer disk 82 upon the further screwing-in motion then assumes the bearing function.

Figure 38:
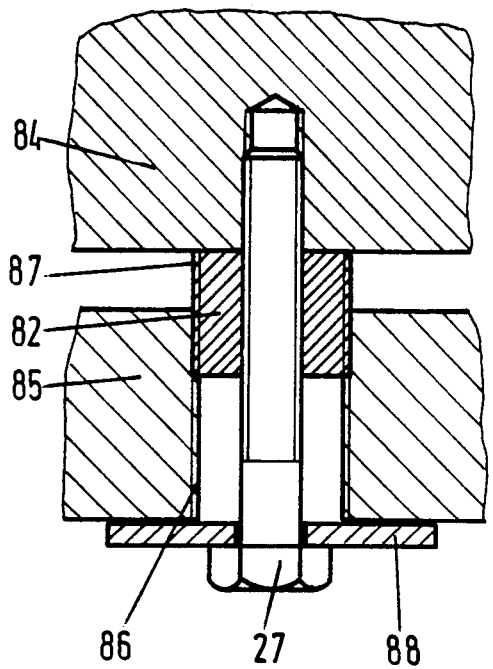
FIG. 38 shows the fourteenth embodiment of the device, also in longitudinal section.

In accordance with FIG. 38, which shows the fourteenth embodiment, two structural parts 84 and 85 are also clamped together at a distance apart. The structural part 85 has a continuous threaded borehole 86 with right-hand thread which forms the mating pitched bearing surfaces. The external thread 87 of the spacer disk 82 engages into the threaded borehole 86. The external thread 87 accordingly also has a right-hand pitch. The fastening screw 27, which passes with friction locking through the spacer disk 82, carries the spacer disk 82 along with it in the screwing-in direction when it is screwed in so that said disk rests against the facing surface of the structural part 84. The fastening screw furthermore passes through a washer 88 against which the screw head of the fastening screw presses. In this embodiment also, the length of the spacer disk 82 is greater than the open space between the structural parts 84, 85. The structural part 84 forms a threaded borehole with right-hand inner thread to receive the fastening screw 27.

Figure 39:
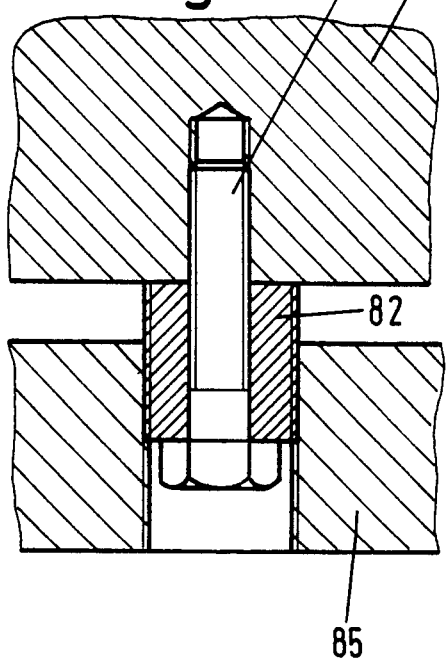
FIG. 39 shows the fifteenth embodiment of the device, in the clamping position.

In the fifteenth embodiment, shown in FIG. 39, which corresponds extensively to the fourteenth embodiment, the same structural parts bear the same reference numbers. The head of the fastening screw 27 now rests directly against the end surface of the spacer disk 82. The screw clamping force is accordingly transmitted via the pitched bearing surfaces.

Figure 40:
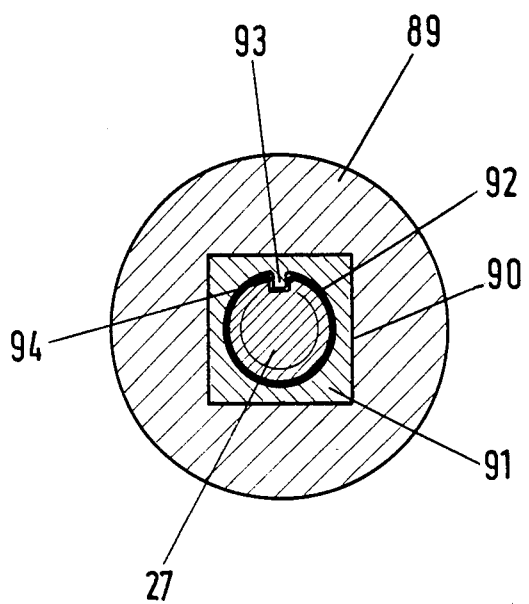
FIG. 40 is a cross section through the device according to the sixteenth embodiment, in which the spacer disk is coupled in form-locked manner to the fastening screw.
Figure 41:
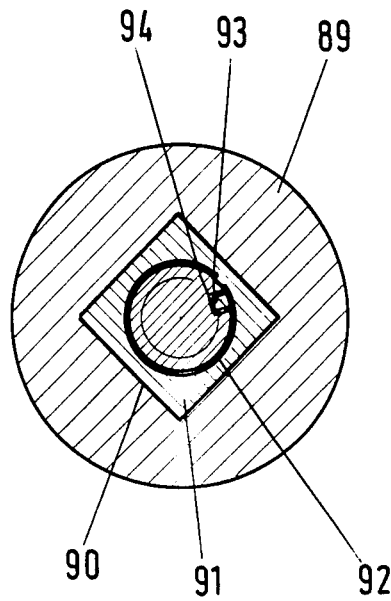
FIG. 41 is a showing corresponding to FIG. 40, but with the form lock released.

In FIGS. 40 and 41, which show the sixteenth embodiment, the spacer disk 89 is provided centrally with a square opening 90 into which a shaped piece 91 of plastic fits. Said shaped piece contains a passage borehole 92 for the fastening screw 27. Into the passage borehole 92 there extends a rib 93 which extends integrally from the shaped piece and which engages in form-fitting manner into a longitudinal groove 94 in the fastening screw 27. In this way, upon turning of the fastening screw 27, the spacer disk 89 is carried along into its bearing position. The spacer disk 89 remains stationary and the fastening screw 27 turns relative to it, the rib 93 being sheared off by the corresponding edge of the longitudinal groove; see FIG. 41.

Figure 42:
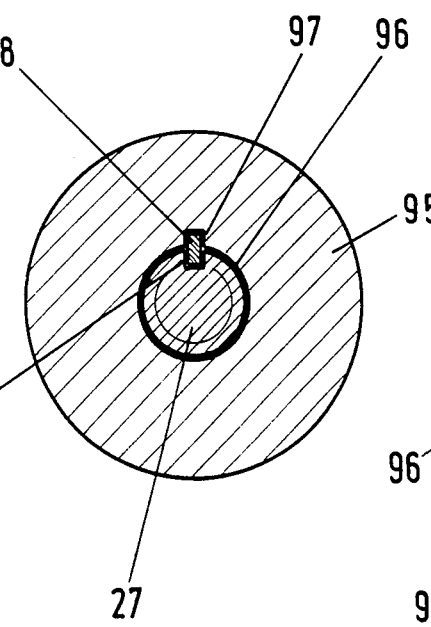
FIG. 42 is a cross section through the device according to the seventeenth embodiment with a coupling piece between spacer disk and fastening screw.
Figure 43:
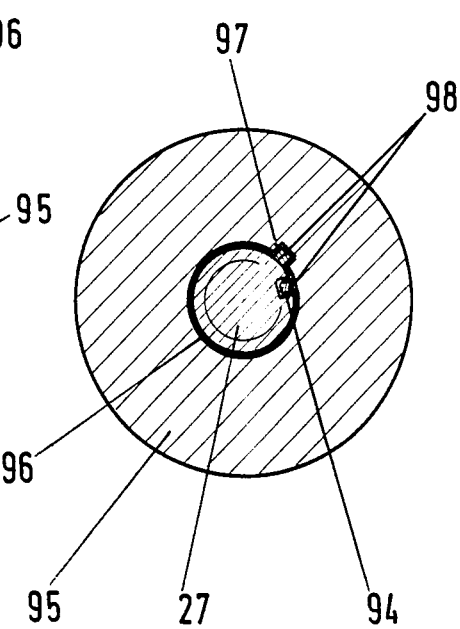
FIG. 43 is a view corresponding to FIG. 42, after the releasing of the form lock.

The seventeenth embodiment, shown in FIGS. 42 and 43, has a spacer disk 95 whose passage opening 96 forms a radially directed groove 97. A coupling piece 98 engages by on edge into said groove. The opposite edge, an the other hand, extends into the longitudinal groove 94 of the fastening screw 27, producing a form-locked connection. If the spacer disk 95 is brought into the bearing position by turning the fastening screw then, upon further turning of the fastening screw 27, the coupling piece 98 is cut through, releasing the form lock; see FIG. 43.

Herein for the claims the spacer disk 9 can include elements of the plastic mount as claimed.

We claim:

1. A device for the clamping connection of structural parts which are spaced from each other by a space, comprising
    a spacer disk arranged within said space and having an outer broad side engagable against one of the structural parts,
    the spacer disk includes helical first pitched bearing surfaces,
    form-fitting helical mating second pitched bearing surfaces coordinated with the other structural part are located facing said first pitched bearing surfaces, rotation of the bearing surfaces with respect to each other determining an axial position of said spacer,
    a fastening screw having a wall surface,
    said fastening screw engages said structural parts, the wall surface of said fastening screw forms an operative connection with said spacer disc so as to carry said spacer disk along therewith, during turning of said screw, into a bearing position of said outer broad side of said spacer disk against said one structural part.

2. The device according to claim 1, wherein said spacer disk comprises
    a metal disk, and
    a plastic mount disposed on said metal disk having inwardly directed collar sections, said collar sections comprise means for frictionally locking with the wall surface of said fastening screw.

3. The device according to claim 1, further comprising
    a dowel pin having a head, said dowel pin is engaged with said other structural part, said mating second pitched bearing surfaces are on said head of said dowel pin.

4. The device according to claim 3, wherein said mating second pitched bearing surfaces are formed by an external-wall thread of said head of said dowel pin.

5. The device according to claim 2, wherein said other structural part provided with said mating second pitched bearing surfaces is formed with a shoulder,
    said plastic mount forms a resilient tongue which engages behind said shoulder.

6. The device according to claim 1, wherein said spacer disk includes a mount encasing said spacer disk, said mount has a rotation stop, the latter engaging said spacer disk so as to jointly rotatably connect the spacer disk and said mount.

7. The device according to claim 1, wherein said mating second pitched bearing surfaces are on the end of a collar which is pressed out of said other structural part.

8. The device according to claim 1, further comprising
    a bushing, said mating second pitched bearing surfaces are arranged on said bushing,
    pin means for securing said bushing against turning, said pin means engages a hole of said other structural part and projects from an annular surface of said other structural part.

9. The device according to claim 1, wherein said spacer disk has an inner opening,
    a leaf spring engages against said wall surface of said fastening screw providing said frictional locking,
    said leaf spring is coordinated in secant form with said spacer disk and is tangent to said inner opening.

10. The device according to claim 9, wherein said spacer disk is formed with a channel of secant form,
    said leaf spring is inserted from a broad side into said channel.

11. The device according to claim 1, wherein said spacer disk is jointly carried along with said fastening screw, upon turning the latter, into a bearing position against said one structural part by means of a releasable form locking with said fastening screw.

12. The device according to claim 1, wherein said connection is a friction connection.

* * * * *